United States Patent Office 2,779,657
Patented Jan. 29, 1957

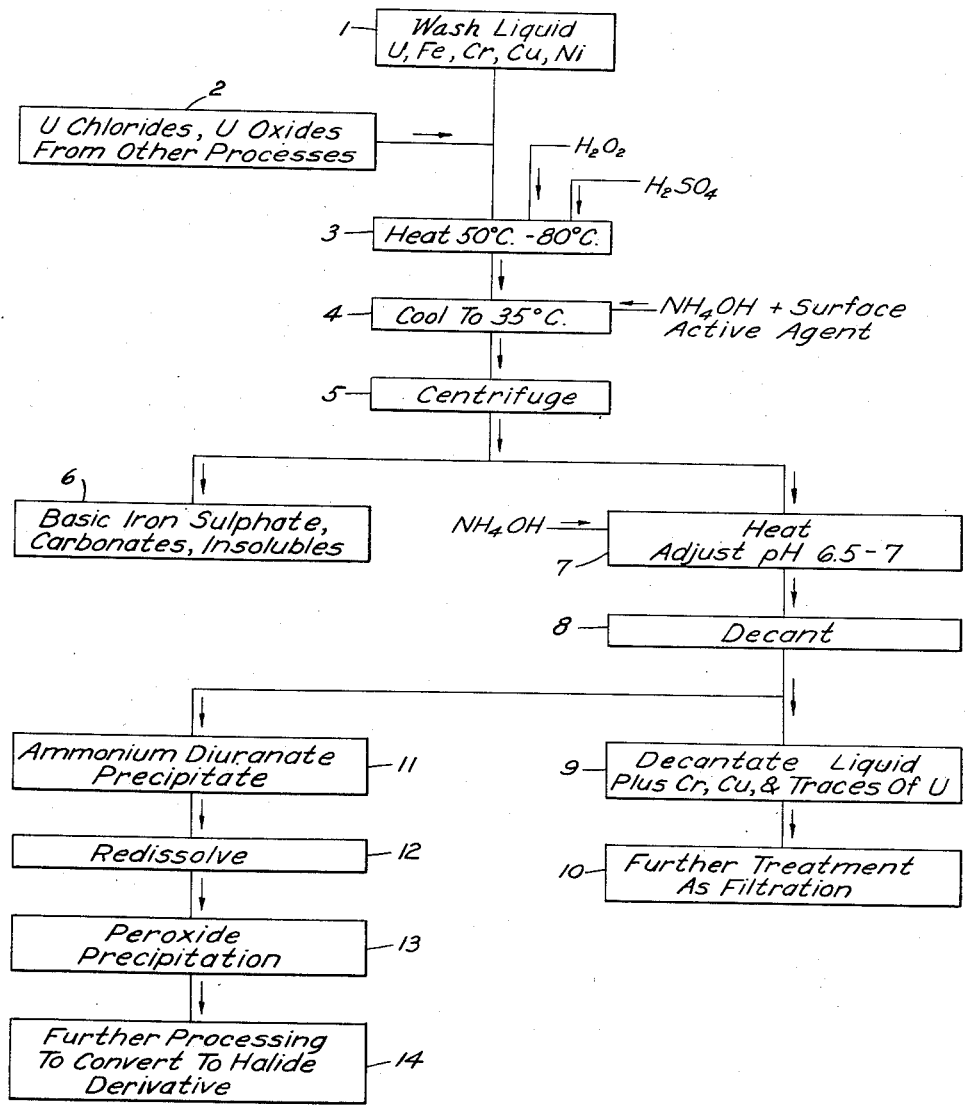

2,779,657
RECOVERY OF URANIUM FROM WASH LIQUIDS

Albert E. Ballard, Oak Ridge, Tenn., assignor, by mesne assignments, to the United States of America as represented by the United States Atomic Energy Commission Application November 19, 1945, Serial No. 629,667

6 Claims. (Cl. 23—14.5)

This invention relates to the separation and recovery of uranium. More particularly, the invention relates to the recovery of uranium from wash solutions or comparable liquids containing the uranium in the presence of various extraneous materials.

In a number of existing processes there results or in connection with such processes liquids are obtained having a content of uranium therein which it is desired to recover. The production or obtaining of such solutions or liquids containing uranium is not a part of the present invention, but is the invention of others. Detailed disclosure is contained in a number of copending applications exemplified by Carter et al. Ser. No. 532,159, now Patent No. 2,758,006, issued August 7, 1956, and Kamen Ser. No. 532,160, and in other copending applications to which reference may be made for further information relative to the production of uranium, illustrative compositions of the various materials obtained and other details. The present invention is not limited to the treatment of any particular source of a liquid containing uranium, but is particularly applicable, for example, to the types of solutions which may be obtained in the processes of the type described in the aforementioned copending applications.

However, uranium in such liquids may be in the presence of a large amount of extraneous material. While such extraneous material may of itself have possible value, its value may be regarded as negligible as compared with the uranium. Hence, for the purposes of the present invention such other material may be regarded as undesirable. It happens in many instances that this extraneous material may be a number of times greater than the content of the uranium which it is desired to recover. That is, as explained in detail in the aforementioned copending applications, the liquids containing uranium also contain extraneous material comprising metallic and non-metallic components such as iron, chromium, nickel, copper, carbon, and the like. The presence of these other components may be due to some extent to contamination in the original raw materials, but usually extraneous material is picked up during the methods of producing the uranium, or in the various washing methods used in such processes for washing the uranium from stainless steel, or other parts of processing apparatus.

For example, while materials which may be treated in accordance with the present invention may contain from 5 to 1200 milligrams or more of uranium per liter, there may be present many more milligrams of iron, copper, chromium, and nickel. Because of the presence of these other components which may be in substantial amounts, separation and recovery of the uranium presents a considerable problem.

I have found that separation and recovery of uranium from such solutions may be accomplished by the procedure described in detail hereinafter, including eliminating iron as an easily separable precipitate and precipitating the uranium as the peroxide.

While certain of the individual steps of my process may be similar to prior procedures which are the inventions of others, it is believed that the combination of steps described herein is novel. It is also believed that the step herein of eliminating iron as a relatively easily filterable precipitate, described as a basic iron sulfate, is novel per se, as are other aspects of my process which will be described.

One object of the present invention is to provide a method for the separation and recovery of uranium materials.

Another object is to provide a separation and recovery method which may be applied to liquids containing uranium in the presence of other components, whether these other components be present in relatively small amounts or present in aggregate quantities which exceed the quantity of the uranium.

Another object is to provide a method for the separation and recovery of uranium from liquids containing the uranium in the presence of iron whereby substantially all of the uranium is recovered without material loss of the uranium along with the iron.

Still another object is to provide a method for the precipitating in an environment of the class described, of an easily separable iron precipitate.

Another object is to provide a method of precipitating a basic iron sulfate in the presence of uranium materials.

Another object is to provide a recovery process of the class described, wherein certain materials containing uranium from other processes may be incorporated and this uranium recovered.

Other objects will appear hereinafter.

The composition of the liquid containing the uranium may vary over wide limits, and reference may be made to the aforementioned copending applications for further details relative to the composition of such liquids. It is sufficient for the purposes of the present description to point out that, in general, the liquids which are particularly susceptible of treatment in accordance with the present invention, in addition to containing the uranium which it is desired to recover ultimately as the peroxide, will also contain extraneous components such as Cr, Cu, Fe and the like. It is generally preferred that the Fe content, based on the uranium content be not greater than 15% to 20% thereof. However, the aggregate contents of the Fe, Cu, Cr and the like may exceed the uranium content. It has been found that such liquids may be effectively processed by the present invention to throw down an easily separable iron-containing precipitate. The liquid thus freed of the bulk of the Fe but containing the uranium in the presence of some of the extraneous components as Cr, Cu, and the like may be further processed to throw down the uranium away from other extraneous matter.

A general understanding of my process may be had by reference to the attached drawing forming a part of the present application. This drawing is in the nature of a flow sheet illustrating one general combination of steps in accordance with one embodiment of my invention which may be applied to liquid containing uranium in the presence of extraneous matter for separating the desired uranium.

Referring now to the drawing, 1 represents a source of the wash liquid which is to be processed, containing the uranium and the other components. To this liquid may be added materials from other processes such as uranium chlorides and oxides as indicated at 2. That is, to the wash solutions for which the present recovery processes are particularly applicable there may be added uranium residues or other sources of uranium from different processes. For example, there may be added some of the uranium chloride residues obtained in Schmidt and Krohn, Sublimation Apparatus, Ser. No. 553,446, filed September 9, 1944, now Patent No. 2,743,168, issued April 24, 1956.

The combined liquid from whatever source is conducted to 3 where it is heated between 50° C. and 80° C. in the presence of hydrogen peroxide or other oxidizing medium and also in the presence of sulfuric acid, although this source of sulfate ions may be added later. The purposes of these operations are principally to convert the uranium to the hexavalent state, and convert and/or maintain the iron contamination in the ferric state, and other metallic contaminate in their higher stable valence state. Thereafter the liquid is cooled to, for example, around 35° C. or lower at 4 and a source of hydroxyl ions such as ammonium hydroxide is added. These operations serve to cause the formation of a basic iron sulfate. Also in this phase of the process surface active agents, exemplified by aerosol, may be incorporated for further facilitating the separation of the basic iron sulfate precipitate.

This precipitate is separated either by filtration or in a centrifuge as indicated at 5. This basic iron sulfate precipitate may contain insolubles such as metal particles and carbon particles, and is conducted to 6 where it may be subjected to salvage. However, if the iron is only 15%–20% of the uranium, very little uranium is carried along and salvage may not be warranted.

The effluent from step 5 is conducted to 7 where the effluent containing the uranium now freed of a substantial quantity of the iron as well as other contaminants is heated, and the pH of the solution adjusted to between about 6.5 to 7 by the incorporation of ammonia hydroxide which throws down a precipitate. Also in this phase of the process certain of the contaminants such as copper and nickel are complexed.

The precipitate and liquid may be separated in 8 by decantation, the decantate being conducted to 9 where it may be held for salvage if desired, but may contain little, if any, of the uranium and therefore may be discharged to waste in some instances. However, usually it would be passed through a filter as indicated at 10.

The precipitate comprising ammonium diuranate is conducted to 10 from which it may be subjected to a sequence of operations for ultimately converting the uranium to a halide derivative. For example, the diuranate may be redissolved at 12 and a cold peroxide precipitation applied to this solution at 12. This peroxide precipitation may be in acordance with the procedures described in Carter and Larson, Ser. No. 559,624, filed October 20, 1944, for Process of Recovering Uranium.

The peroxide separated may be further processed by calcining and halogenation to convert it to a desired derivative as broadly indicated at 14.

By the above procedure generally outlined, waste solutions may be relatively speedily treated to eliminate iron and other contaminants such as copper and chromium away from the uranium by relatively simple steps involving precipitation, centrifugation, decantation and the like such as above described. It is found that the separation of iron in the foregoing manner, provided the iron is not more than 20 percent of the uranium content, carries insufficient of the uranium to be material. In the event larger quantities of iron are separated, it may be desirable to subject this iron precipitate to further processing. For example, a method is described in my companion copending application Ser. No. 617,126, filed September 18, 1945, now Patent No. 2,733,128, issued on January 31, 1956. In any event it has been found that the iron may be separated in a relatively easily centrifugable or filterable precipitate as contrasted with the gummy, difficultly separable precipitate comprising iron hydroxide. The exact composition of the precipitate designated herein as basic iron sulfate is not at present known, but may comprise both iron sulfate and iron hydroxide. However, applicant does not wish to be bound by any specific representation relative to composition as it is sufficient to point out that precipitate formed in accordance with the present invention exemplifies improved separability qualities as compared with other methods of precipitating iron under similar circumstances.

The advantages and operation of my invention will be further apparent from a consideration of the following specific examples.

*Example 1*

In this example between 600 to 700 gallons of a solution was treated which contained uranium and was contaminated with iron to the extent of about .2%, chromium between .5% and .3% and copper from .2% up to .8%. The liquid comprised an aggregate of variable composition from various wash steps. The process comprises the following steps:

The wash solution comprising about a 3%–4% solution, based on uranium content, was pumped to an oxidizing tank. The solution was oxidized with hydrogen peroxide to convert the uranium to its hexavalent state. About .1% excess peroxide was used, but too large an excess would tend to precipitate the uranium.

The solution thus oxidized was treated with sulfuric acid to make the solution approximately .1 M in sulfate ion. Ammonium hydroxide was then added to obtain a pH of about 3.1. At this pH, in the presence of sulfate ion, the iron impurity was coagulated. The solution was kept at a temperature of between 10°–40° C. and promptly centrifuged to remove the basic iron sulfate precipitate.

The effluent from this separation step was conducted to a reactor where a greater amount of ammonium hydroxide (i. e., larger than that to obtain a pH 6.5–7 as above described) was added to obtain a pH of from 7.5 to 8. This larger amount furnishes ammonium hydroxide for inhibiting the chloride ions which may be present in the liquid being treated in this particular example from the uranium chloride compounds in the wash liquids, thereby preventing the chloride ions from attacking stainless steel equipment in which the process may be carried out. Also the excess ammonium hydroxide aids in dissolving the copper and nickel compounds as ammonium complexes. The materials were digested for approximately one and one-half hours at between 50° C. to 85° C.

After digestion, the material was allowed to settle, and the supernatant liquid containing the copper and nickel ions in solution was decanted off, leaving a precipitate of ammonium diuranate. This precipitate was washed several times with a dilute (1%) solution of ammonium hydroxide.

After washing, the uranium precipitate was dissolved in 5% nitric acid, and the resultant solution filtered through glass cloth filters for removing any solids. Preferably only such quantity of nitric acid is employed as is necessary to place the uranium precipitate in solution. The filtered solution of uranium nitrate was run to a reactor and the pH was adjusted to 3.3–3.5, at a controlled temperature. The specific temperature depends on agitation, water source, etc. Between 30° C.–40° C. is satisfactory.

Thereafter the temperature was adjusted to between 40° C.–50° C. and the solution made 1.25 M with respect to $H_2O_2$ by the addition of 30% $H_2O_2$. This was carried out by gradual addition for 30 minutes with stirring. Then the pH was adjusted back to 2.25 with $NH_4OH$. The mixture was digested at temperature for 30 minutes.

The precipitate was allowed to settle; the supernatant liquid decanted; and the precipitate washed three times with wash solution containing 2% $H_2O_2$. The slurry from the third washing was sent to a centrifuge as fast as it may be operated on fine precipitate. All the solids from the centrifugations were passed to a steam rotary drier and dried at 130° C.–140° C. for 5–12 hours in air, using a slow stream of dry air.

The solids from the drier were crushed where necessary and calcined at 300–350° C. Dry air was used for cooling. A lower valent oxide was obtained, this product being cooled in water-jacketed cooler.

Another example illustrating the application of my process follows:

Example II

In this example the waste solution treated comprised 700 gallons of liquid containing approximately 15 milligrams of uranium per milliliter of solution and also was contaminated with iron components to the extent of about .2%, chromium about .1%, and copper greater than the iron and approximately .2% to .5%. In addition certain residues, comprising 3% uranium chloride, were added. In passing it will be noted that at this point residues, such as uranium oxide, may also be added if available. To this heterogenous liquid, as just described, containing uranium for recovery, about 8 gallons of 95% sulfuric acid were added and the pH was checked. In order to drop the pH to below 1, a small amount of nitric acid was added. Then 30% hydrogen peroxide was added until this solution was slightly turbid. As indicated in the previous description, too much peroxide might tend to precipitate uranium. However, in general, any amount between 6 and 20 gallons, in a batch comparable to the present, may be added dependent upon the rapidity desired for complete oxidation of the uranium to the hexavalent state. The resultant solution was heated between 50° C. and 80° C. for about an hour, which was regarded as sufficient in the present example for obtaining complete oxidation, and then the solution was cooled to below 35° C. at which time 28% ammonium hydroxide was added to give the liquid a pH of 3.3 to 3.5. The exact amount of the alkaline hydroxide to add will depend upon the initial acidity of the liquid. However, in general, 35 to 45 gallons of ammonium hydroxide is ample to obtain the desired pH. In the event any substantial quantity of uranium oxide has been added, the pH can be controlled at about 2.5. About 2 gallons of a 10% aqueous aerosol solution was also added for assisting in the speeding up of separation of precipitate. However, as described above, the basic iron sulfate precipitate formed is much more easily filterable or centrifugable than usual iron precipitates. Hence, the further facilitating of this separation, as by adding surface active agents, is optional.

The precipitate which separates removes substantially all of the iron as the basic iron sulfate which may be centrifuged out along with carbon and other insolubles.

The centrifuge effluent in this example, now freed of iron and some of the other contaminants, was heated to 90° C., and the pH adjusted to 6.5 to 7 by the addition of 28% ammonium hydroxide. About 8 to 10 gallons was sufficient to give this pH and preferably this alkaline hydroxide addition is made over a 20–30 minute period, as it was in this example, accompanied by agitation.

The resulting diuranate precipitate quickly settled, and the separation is sufficiently defined that in 30 to 45 minutes the supernatant liquid may be decanted from the precipitate. The decantate in this example contained less than 20 mg. of uranium per liter as a partly suspended unsettled component which may be recovered by passing the liquid through a filter-press, the filtrate from this operation being dischargeable to waste free of uranium.

The diuranate decanted-precipitate from the above step was dissolved in nitric acid, and the resultant solution concentrated to an 8% solution based on the uranium content. The uranium was precipitated from this solution as the peroxide, and the peroxide content converted to a halide in accordance with the procedures described in the copending applications referred to earlier herein.

Example III

In accordance with this example, the liquids treated and the manner of treatment were identical with the procedure described in Example II up to the treatment of the centrifuge effluent from the basic iron sulfate precipitation at which point, in this example, a different treatment was applied.

That is, this uranium containing effluent freed of iron was treated directly to throw down a peroxide precipitate without first throwing down the diuranate precipitate. This was accomplished by adjusting the pH of the centrifuge effluent to about 2 and maintaining the temperature below 30° C. Between 23° C. and 27° C. was used in this example. Then 30% hydrogen peroxide was added slowly while at the same time making such additions of ammonium hydroxide as may be required to hold the pH at 2. The liquid was then cooled to below 5° C. and about 1 gallon of peroxide further added for each 15 minutes of cooling time required. Also the pH was kept at 2 by adding ammonia hydroxide. Then about 40 gallons excess of 30% hydrogen peroxide was added along with about two gallons of aerosol surface active agent.

A well-defined uranium peroxide precipitate separated. A large part of the supernatant liquid was decanted and discharged to treatment for removing any small amount of uranium therein. The remainder of the precipitate was filtered, the peroxide dried, calcined, and converted to the halide.

It has been shown by the above examples that uranium may be recovered from wash liquids containing uranium in the presence of impurities such as iron which heretofore have presented problems of forming gummy, gelatinous masses presenting difficulties of separation. By the present process the iron may be quickly eliminated under the controlled pH and temperature provided. While in the above example reagents such as sulfuric acid and hydrogen peroxide have been described as preferred because such agents furnish the desired radical without incorporating contaminating components other than hydrogen, other reagents may be employed. For example, sodium acid sulfate or the like may be employed for a source of sulfate ions but, of course, incorporates the sodium ion into the liquid. While aerosol has been described as the surface active agent used, there are other similar agents which may be used. For example, reference may be made to Industrial and Engineering Chemistry, Industrial edition, for January 1941, relative to such other agents. Such surface active agents may be employed, if desired, but their use is not an integral part of the present invention. While a pH of between 3.1–3.5 is usually preferred for forming the basic iron sulfate, other pH conditions may, in some instances, be employed.

It is to be understood that all matters contained in the above description and examples are illustrative only and do not limit the scope of this invention as it is intended to claim the invention as broadly as possible in view of the prior art.

I claim:

1. A process of treating liquids which contain uranium values contaminated with dissolved iron, chromium, and copper which comprises concentrating the solution, subjecting the solution to an oxidation treatment for converting the uranium values to its hexavalent state, precipitating iron in the presence of a surface active agent from the solution as the basic sulfate, treating the effluent containing uranium values freed from iron to throw down the uranium values as a diuranate precipitate, digesting the precipitate at elevated temperature, separating this diuranate precipitate, redissolving the precipitate and throwing down the said uranium values as a peroxide precipitate.

2. In a process for decontamination and recovery of uranium values from an aqueous solution containing the same together with dissolved iron contamination, the improved method for the removal of said iron contamination from the solution which comprises, while maintaining said uranium values therein in the uranyl oxidation state and said iron contamination in the ferric state, incorporating the source of sulfate ion in said solution, and, by means of adding a source of hydroxyl ion, raising the pH of the solution to the range pH 3.1 to 3.5, in the presence of a surface active agent incorporated in the solution, to thereby throw down from solution said iron contamination as a precipitate of enhanced separability.

3. In a process for decontamination and recovery of uranium values from an aqueous solution containing the same together with dissolved iron contamination, the improved method for the removal of said iron contamination from the solution which comprises, while maintaining said uranium values therein in the uranyl oxidation state and said iron contamination in the ferric state, incorporating sulfuric acid in said solution to render said solution 0.1 M in sulfate ion, and, by means of adding ammonium hydroxide to said solution, raising the pH of the solution to the range pH 3.1 to 3.5, in the presence of a surface active agent incorporated in the solution, while maintaining the temperature substantially within the range of 10° to 40° C., to thereby throw down from solution said iron contamination as a precipitate of enhanced separability.

4. In a process for decontamination and recovery of uranium values from an aqueous solution containing the same together with dissolved iron, chromium, nickel and copper contamination, the improvement steps which comprise, while maintaining said uranium values therein in the uranyl oxidation state and said iron contamination in the ferric state, incorporating a source of sulfate ion in said solution, and, by means of adding a source of hydroxyl ion, raising the pH of the solution to the range pH 3.1 to 3.5, while maintaining the temperature within the range of 10° to 40° C., to thereby throw down from solution said iron contamination as a precipitate of enhanced separability, thereby removing the resulting precipitate from its supernatant solution, then by means of adding ammonium hydroxide to the remaining supernatant solution precipitating said uranium values therefrom as ammonium diuranate, separating the obtained diuranate precipitate from its supernatant solution, and dissolving the precipitate to form an aqueous acidic solution of said uranium values, and precipitating said uranium values therefrom as uranium peroxide.

5. In a process for decontamination and recovery of uranium values from an aqueous solution containing the same together with dissolved iron, chromium, nickel and copper contamination, the improvement operation which comprises, incorporating sulfuric acid in the solution, adding hydrogen peroxide and heating to render said uranium values to be in the uranyl oxidation state and said iron contamination to be in the ferric state, thereupon by means of adding ammonium hydroxide, in the presence of surface active agent incorporated in the solution, raising the pH of the solution to the range pH 3.1 to 3.5, while maintaining the temperature within the range of 10° to 40° C., to thereby throw down from solution said iron contamination as a precipitate of enhanced separability, then removing the resulting precipitate from its supernatant solution, then by means of adding ammonium hydroxide to the remaining supernatant solution raising the pH to the range 6.5 to 8 to precipitate therefrom said uranium values as ammonium diuranate, separating the obtained diuranate precipitate from its supernatant solution, dissolving the separated precipitate in an aqueous nitric acid solution, and, while maintaining the pH of the resulting solution at substantially pH 2, adding hydrogen peroxide thereto to precipitate said uranium values as uranium peroxide.

6. In a process for decontamination and recovery of uranium from an aqueous solution containing the same, as a nitrate, in concentration of at least the order of 3 to 4 percent by weight with respect to uranium, together with dissolved iron contamination in concentration of at most 20 percent by weight of the uranium concentration, along with dissolved chromium, nickel and copper contamination, the improvement operation which comprises, incorporating sulfuric acid to render the solution substantially 0.1 M in sulfate ion, then while maintaining the pH below 1 and the temperature within the range 50° to 80° C. adding hydrogen peroxide to render said uranium values to be in the uranyl oxidation state and said iron contamination to be in the ferric state, thereupon by means of adding ammonium hydroxide in the presence of surface active agent incorporated in said solution raising the pH of the solution to the range pH 3.1 to 3.5, while maintaining the temperature within the range 10° to 40° C., to thereby throw down from solution said iron contamination as a precipitate of enhanced separability, removing the resulting precipitate from its supernatant solution, thereupon adding ammonium hydroxide to the remaining supernatant solution to raise the pH to the range pH 6.5 to 8, and digesting at temperature within the range of 50 to 85° C., to precipitate said uranium values as uranium diuranate, separating the obtained diuranate precipitate from its supernatant solution, dissolving the separated diuranate precipitate in dilute aqueous nitric acid, and while maintaining the pH of the obtained solution at substantially pH 2, adding hydrogen peroxide thereto to precipitate said uranium values as uranium peroxide.

References Cited in the file of this patent

Friend: Textbook of Inorganic Chemistry, vol. 7, part 3, pages 307 and 311 (1926). Published by Charles Griffin and Company, London.

Britton: Hydrogen Ions, pages 278–283 (1929). Published by D. Van Nostrand Company, New York.